April 4, 1944.　　　　J. M. DAILY　　　　2,345,798
OZONE GENERATOR
Filed Feb. 15, 1940　　　3 Sheets-Sheet 2

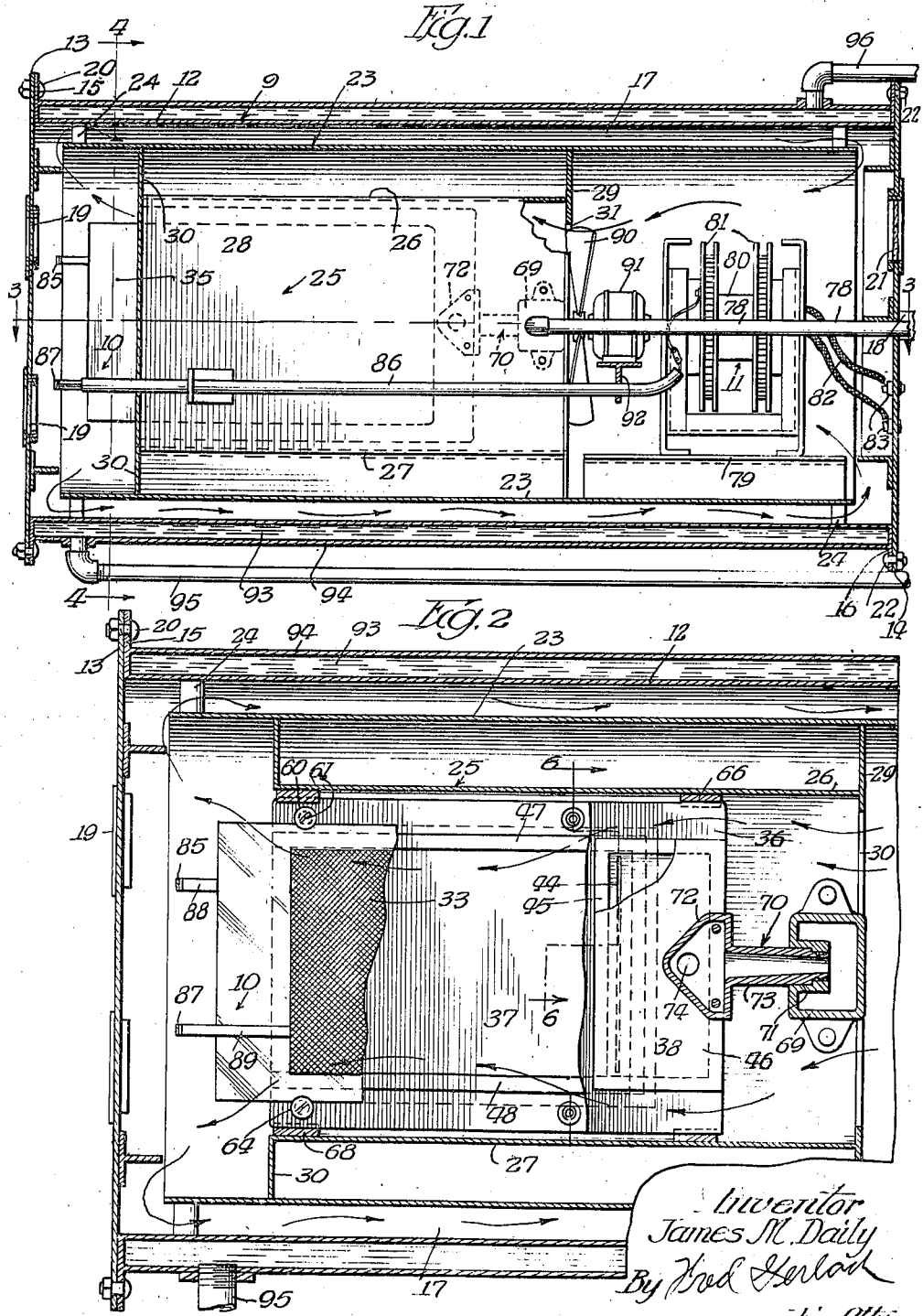

Inventor
James M. Daily
By Fred Gerlach
his Atty

April 4, 1944. J. M. DAILY 2,345,798
OZONE GENERATOR
Filed Feb. 15, 1940 3 Sheets-Sheet 3
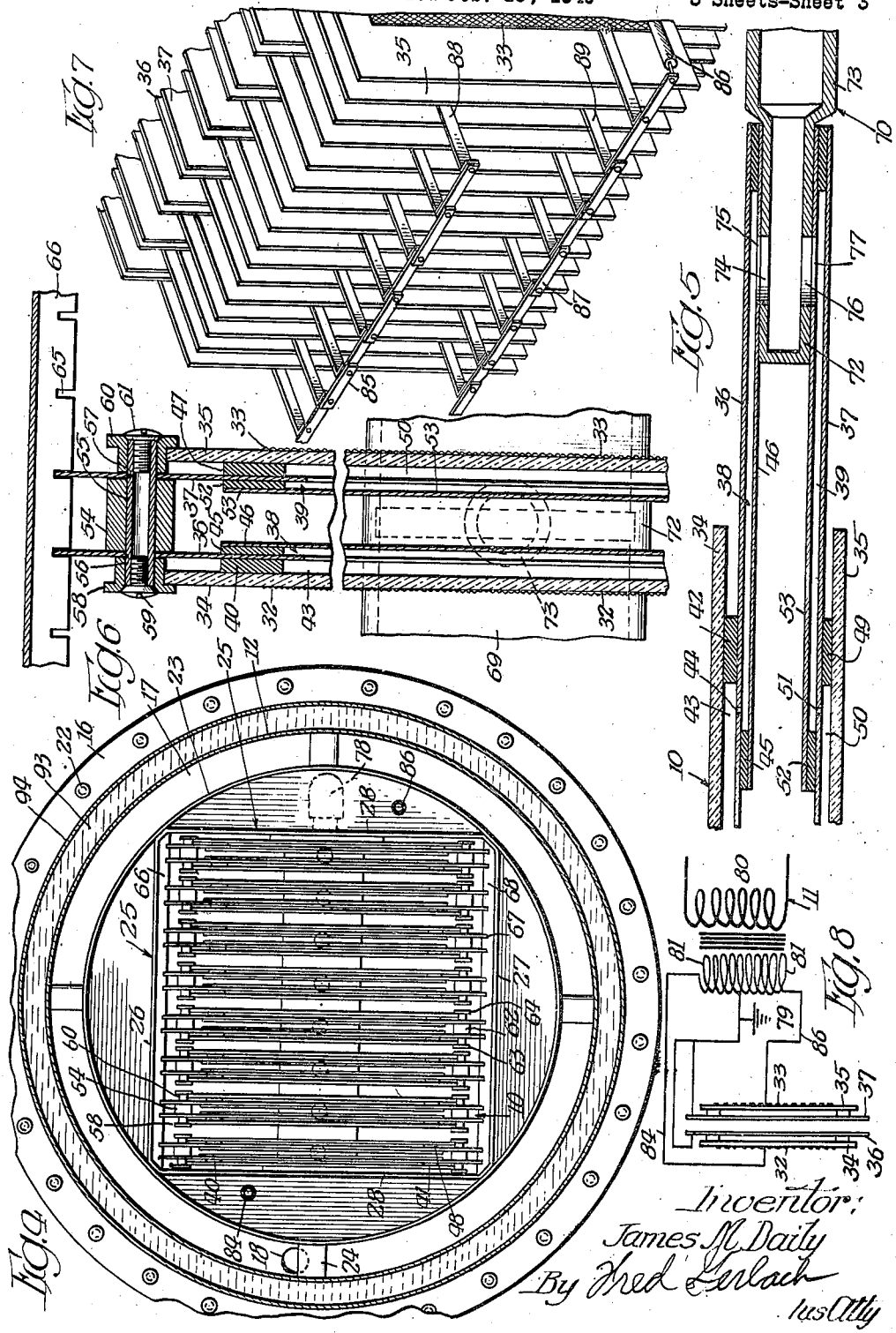

Patented Apr. 4, 1944

2,345,798

UNITED STATES PATENT OFFICE 2,345,798

OZONE GENERATOR

James M. Daily, Merchantville, N. J., assignor to American Ozone Company, Chicago, Ill., a corporation of Illinois Application February 15, 1940, Serial No. 318,993

18 Claims. (Cl. 204—318)

The present invention relates generally to ozone generators. More particularly the invention relates to that type of ozone generator which operates to produce ozone or ozonous air by way of an electric discharge and as its main parts comprises:

(1) An air-tight housing, the interior of which forms a pressure chamber and is adapted to receive air under pressure by way of a compressor or other means;

(2) A series of generator units in the housing and consisting of high tension and neutral or grounded electrodes which are arranged in pairs and are spaced apart so as to form ozonous air producing spaces therebetween; and (3) A step-up transformer which has the secondary coil thereof connected electrically to the high tension electrodes of the generating units and operates in connection with use of the generator to supply such high voltage current to the high tension electrodes that the resulting discharge between the high tension electrodes and the neutral or grounded electrodes forms the air in the ozone producing spaces between the electrodes into ozonous air or ozone.

One object of the invention is to provide an ozone generator of this type which is an improvement upon, and has certain advantages over, previously designed electric ozone generators of the same general character and is so designed and constructed that it not only may be manufactured at a comparatively low cost but also is exceptionally efficient in operation.

Another object of the invention is to provide an electric ozone generator of the type and character under consideration which is in the form of a self-contained unit by reason of the fact that the transformer is mounted in the housing.

Another object of the invention is to provide an electric ozone generator of the last mentioned character in which the generating units are of the air-cooled variety and the air under pressure within the housing is caused during operation of the generator to flow continuously around the units and past the transformer for cooling purposes by means of a fan in the housing.

Another object of the invention is to provide an ozone generator of the type and character last mentioned which includes simple and novel means for cooling the air under pressure as it is circulated by the fan within the housing.

A further object of the invention is to provide an electric ozone generator of the hereinbefore recited type in which the generating units are of simple and novel design and are so arranged and mounted within the housing that they may be readily removed for purposes of cleaning or replacement.

A still further object of the invention is to provide an ozone generator of the type under consideration which includes novel means for collecting ozonous air which is produced in the spaces between the high tension and neutral or grounded electrodes by the discharge between such electrodes, and also includes a novel electrical hook-up between the transformer and the high tension electrodes.

Other objects of the invention and the various advantages and characteristics of the present electric ozone generator will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of an electric ozone generator embodying the invention;

Figure 2 is an enlarged vertical longitudinal section of the front end of the generator, illustrating the manner in which the generating units are mounted and positioned in said end of the housing;

Figure 4 is an enlarged vertical transverse section taken on the line 4—4 of Figure 1, illustrating the manner in which the generating units are mounted in place;

Figure 5 is an enlarged horizontal section of one of the generating units, showing in detail its construction and design and also illustrating the construction, design and arrangement of the means for collecting the ozonous air which is generated by the unit;

Figure 6 is an enlarged vertical transverse section taken on the line 6—6 of Figure 2;

Figure 3:
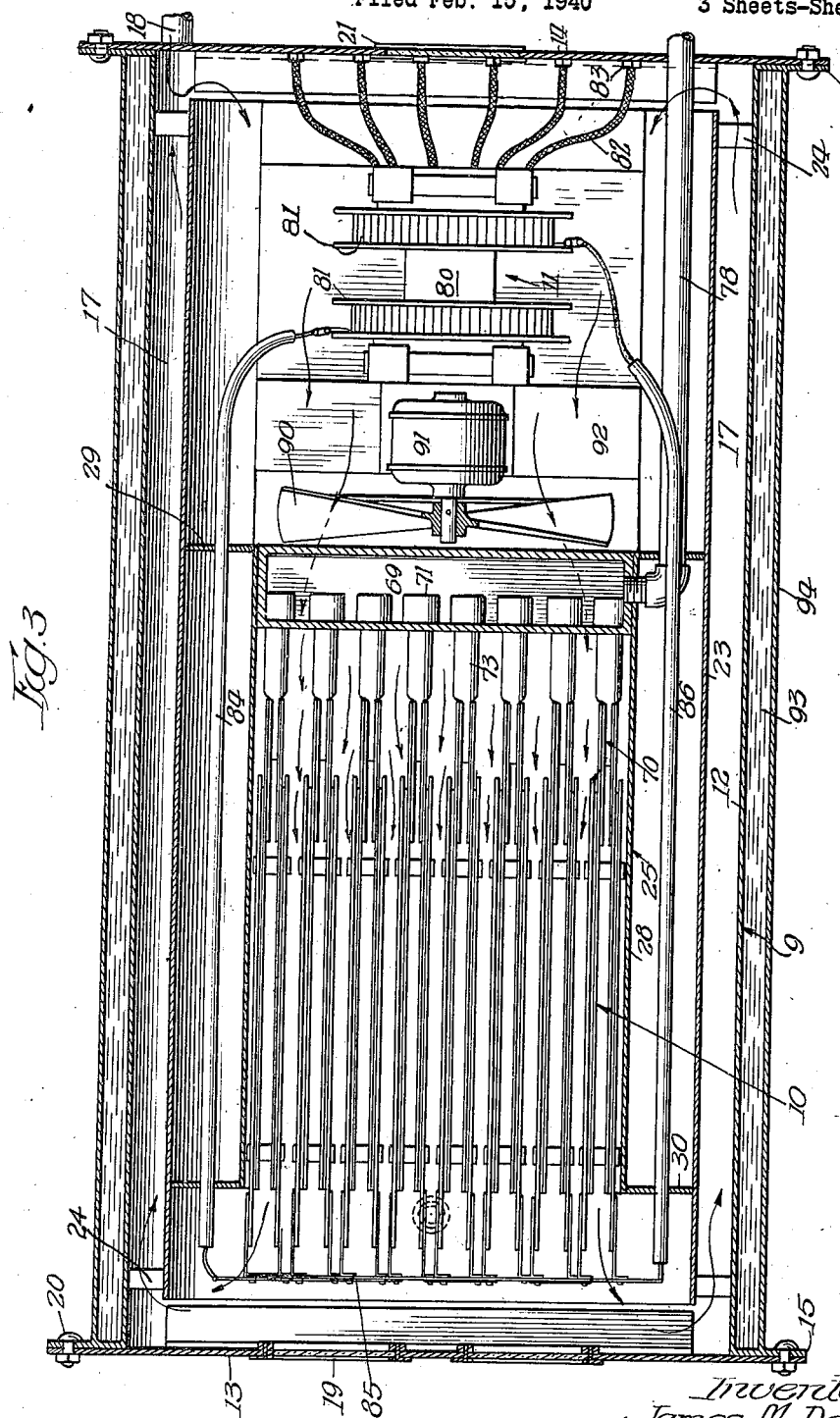
Figure 3 is an enlarged horizontal section taken on the line 3—3 of Figure 1 and showing the arrangement of the generating units, the step-up transformer and the air circulating fan.

Figure 7 is a fragmentary perspective showing the front portions of the generating units and illustrating the construction and arrangement of the two bus bars which constitute part of the electrical hook-up between the transformer and the high tension electrodes; and Figure 8 is a diagrammatic view of the transformer, showing the manner in which the latter is grounded and also the manner in which it is hooked up to the high tension electrodes of one of the generating units.

The generator which is shown in the drawings constitutes the preferred form or embodiment of the invention. It is designed and adapted to produce ozonous air or ozone for water purifying or other purposes and comprises a cylindrical horizontally disposed housing 9, a series of ozone generating units 10 and a step-up transformer 11.

The housing 9 surrounds and houses the generating units and the transformer and consists of a cylindrical side wall 12, a front end wall 13 and a rear end wall 14. The side wall 12 is provided with an out-turned annular flange 15 at the front end thereof and an out-turned annular flange 16 at its rear end and defines with the two end walls a pressure chamber 17 into which air under pressure is supplied by way of a pipe 18. The front end wall 13 serves as a closure for the front end of the pressure chamber and fits against and extends across the flange 15. It embodies windows 19 in the upper portion thereof and is removably secured in place by way of an annular series of bolts 20. As shown in Figures 1, 2 and 3, the bolts 20 extend through the flange 15 and the marginal portion of the front end wall 13. The windows 19 permit the front portion of the interior of the housing 9 to be viewed from the front end of the housing. The read end wall 14 serves as a closure for the rear end of the pressure chamber 17 and abuts against, and extends across, the flange 16. It has a window 21 in its upper portion and is removably secured in place by way of bolts 22. The latter are arranged in an annular series and extend through aligned holes in the margin of the rear end wall and the flange 16. The pipe 18 is connected to the rear end wall and receives air under pressure from a compressor or other means (not shown). Disposed within the pressure chamber 17 and in spaced relation with the inner periphery of the side wall 12 of the housing 9 is an open ended cylindrical shell 23. This shell terminates inwardly of the front and rear end walls as illustrated in the drawings and is supported in concentric relation with the side wall by way of post-like spacers 24.

The ozone generating units 10 serve to form a portion of the air in the pressure chamber 17 into ozone or ozonous air as described hereafter and are mounted in an open ended box-like frame 25 in the front end of the shell 23. The frame 25 consists of a top 26, a bottom 27, a pair of sides 28 and a rear end 29. The front margins of the top, bottom and sides of the frame are provided with outwardly extending segmental flanges 30 which serve to support the front end of the frame with respect to the shell 23 and close the spaces between the top, bottom and sides of the frame and the front end of the shell 23 against the passage of air therethrough. The rear end 29 of the frame is suitably secured to the rear edges of the top, bottom and sides of the frame and is circular. It embodies in the central portion thereof a circular hole 31 so that air is permitted to circulate through the frame from the rear end thereof to the front. The margin of the rear end 29 fits snugly within the central portion of the shell 23 and serves to support the rear end of the frame and also to close the space between the rear margins of the top, bottom and sides of the frame and the adjacent inner peripheral portion of the shell. Each of the generating units 10 comprises a pair of high tension electrodes 32 and 33, a pair of dielectric plates 34 and 35, a pair of neutral or grounded electrodes 36 and 37 of aluminum or other suitable conducting material and a pair of ozone or ozonous air collecting boxes 38 and 39. The high tension electrodes 32 and the dielectric plates 34 and the neutral or grounded electrodes 36 of the generating units 10 are flat and are positioned vertically. They extend in parallel relation and are disposed in the box-like frame 25 in such manner that they are disposed longitudinally of the housing 9. The high tension electrodes 32 are formed of wire screen or foil and fit flatly against, and are cemented or otherwise fixedly secured to, the central portions of what may be considered or termed the outer faces of the dielectric plates 34. They are rectangular and receive high voltage current from the transformer 11, as hereinafter described. The dielectric plates 34 of the generating units 10 are formed of glass or other dielectric material. They are rectangular and are held in spaced relation with the neutral or grounded electrodes 36 by way of top spacer strips 40, bottom spacer strips 41 and rear spacer strips 42. The neutral or grounded electrodes 36 are in the form of plates of aluminum or other suitable conducting material and are rectangular. They project above and below the top and bottom edges of the dielectric plates 34, as shown in Figure 6, and are positioned in laterally spaced relation with the neutral or grounded electrodes 37. The top spacer strips 40 extend horizontally and are cemented to the upper portions of the opposed faces of the dielectric plates 34 and the neutral or grounded electrodes 36. They are formed of any suitable insulating material and, together with the bottom spacer strips 41 and the rear spacer strips 42, define ozone producing spaces 43 between the dielectric plates 34 and the neutral or grounded electrodes 36. The spaces 43 are open at the front thereof and hence a portion of the air under pressure in the pressure chamber 17 is permitted to flow into them. The bottom spacer strips 41 are formed of the same insulating material as the top spacer strips and extend horizontally. They are positioned in parallel relation with the top spacer strips 40 and are cemented or otherwise secured to the lower portions of the opposed faces of the dielectric plates 34 and the neutral or grounded electrodes 36. The rear spacer strips 42 are also formed of insulating material and extend vertically. They are suitably cemented to the rear portions of the opposed faces of the dielectric plates 34 and the neutral or grounded electrodes 36 and serve to close the rear ends or portions of the ozone producing spaces 43. When high voltage current is supplied to the high tension electrodes 32 a brush or corona discharge takes place between such electrodes and the neutral or grounded electrodes and this discharge operates to transform the air in the spaces 43 into ozone or ozonous air. The ozone or ozonous air which is formed in the spaces 43 due to the pressure of the air in the pressure chamber 17 is caused to flow into the collecting boxes 38 by way of vertically extending slots 44 in the neutral or grounded electrodes 36. The slots 44 are located immediately in front of the rear spacer strips 42 and extend from the bottom spacer strips 41 to the top spacer strips 40. As shown in Figure 5, the collecting boxes 38 fit against the rear portions of the outer faces of the neutral or grounded electrodes 36. They consist of rectangular frames 45 and side plates 46. The frames 45 are cemented to the marginal portions of the side plates 46 and are also cemented to the adjacent portions of the outer faces of the neutral or grounded electrodes 36. The high tension electrodes 33, the dielectric plates 35 and the neutral or grounded electrodes 37 are, respectively, the same as the high tension electrodes 32, the dielectric plates 34 and the neutral or grounded electrodes 36, except that they are reversely positioned. The high tension electrodes 33 correspond in size and shape to the high tension electrodes 32 and, like the latter, are formed of wire screen or foil. They are suitably secured against the central portions of the outer faces of the dielectric plates 35 and are supplied with high voltage current from the transformer 11, as hereinafter described. The dielectric plates 35 correspond in size and shape to the dielectric plates 34 and are spaced from the neutral or grounded electrodes 37 by means of top spacer strips 47, bottom spacer strips 48 and rear spacer strips 49. Such spacer strips correspond, and are positioned similarly, to the spacer strips 40, 41 and 42 and define ozone producing spaces 50 between the inner or opposed faces of the dielectric plates 35 and the neutral or grounded electrodes 37. The spaces 50 are open at the front to receive a portion of the air under pressure in the pressure chamber 17. When a brush or corona discharge is produced between the high tension electrodes 33 and the neutral or grounded electrodes 37 during operation of the generator the air in the spaces 50 is converted or changed into ozone or ozonous air. The ozone or ozonous air which is produced in the spaces 50 flows, due to the pressure of the air in the pressure chamber, into the collecting boxes 39 by way of vertically extending slots 51 in the neutral or grounded electrodes 37. The slots 51, as illustrated in the drawings, are located directly in front of the rear spacer strips 49 and extend from the bottom spacer strips 48 to the top spacer strips 47. The collecting boxes 39 are like, and in spaced relation with, the collecting boxes 38. They consist of rectangular frames 52 and side plates 53 and the latter correspond to and are like the frames 45 and the side plates 46 of the collecting boxes 38. The upper portions of the neutral or grounded electrodes 36 and 37 are held in fixed spaced relation by way of collars 54. There are preferably two collars 54 for each generating unit 10. As shown in Figure 6 the collars 54 are mounted on the central portions of cross sleeves 55. The ends of such sleeves project through aligned holes 56 and 57 in the upper portions of the neutral or grounded electrodes 36 and 37. The ends of the sleeves which project through the holes 56 carry flanged rings 58 and these overlie, and are arranged in hooked relation with, the upper margins of the dielectric plates 34 and are held in clamped relation with respect to the upper portions of the neutral or grounded electrodes 36 by way of screws 59. The latter fit within the ends of the sleeves 55 which project through the holes 56 and have screw threaded engagement with such ends. The ends of the sleeves 55 which project through the holes 57 in the upper portion of the neutral or grounded electrodes 37 carry flanged rings 60 and these overlie, and are arranged in hooked relation with, the upper margins of the dielectric plates 35 and are removably secured in place by means of screws 61. The latter project into the ends of the sleeves 55 which project through the holes 57 and have screw threaded engagement with such ends. When the screws 59 and 61 are tightened to the fullest extent they operate to clamp the upper portions of the neutral or grounded electrodes 36 and 37 against the collars 54 and also urge inwardly the flanged rings 58 and 60 so that the latter maintain the dielectric plates 34 and 35 in clamped relation with the spacer strips which serve to define the ozone producing spaces 43 and 50. The lower portions of the neutral or grounded electrodes 36 and 37 of the generating units 10 are spaced apart by way of collars 62. The latter are vertically aligned with the collars 54 and are mounted on the central portions of sleeves (not shown). The last mentioned sleeves project through aligned holes in the lower portions of the neutral or grounded electrodes and carry at the ends thereof flanged rings 63 and 64. The rings 63 are located beneath the rings 58 and are removably secured in place by means of screws like screws 59. They are arranged in hooked relation with the bottom margins of the dielectric plates 34 and together with the rings 58 hold said dielectric plates against vertical and outward displacement with respect to the neutral or grounded electrodes 36. The rings 64 are located beneath the rings 60 and are positioned in hooked relation with the bottom margins of the dielectric plates 35. They are removably secured in place by screws (not shown) and together with the rings 60 operate to hold the dielectric plates 35 against vertical and outward displacement with respect to the neutral or grounded electrodes 37. The upper margins of the neutral or grounded electrodes 36 and 37 fit slidably within notches 65 in a pair of laterally spaced mounting strips 66 on the under face of the top 26 of the box-like frame 25 and the bottom margins of such electrodes fit slidably within aligned notches 67 in a pair of laterally spaced horizontally extending mounting strips 68 on the top face of the frame bottom 27. When the front end wall 13 is removed the generating units 10 may be slid out of the housing for repair, inspection or replacement purposes. The mounting strips 66 and 68 constitute or exemplify simple means whereby the generating units 10 are so mounted that upon removal of the front end wall 13 they may be slid out of their operative position within the box-like frame 25.

In addition to the housing 9, the generating units 10 and the transformer 11, the generator comprises simple and improved means for collecting the ozone or ozonous air which is produced in the spaces 43 and 50 of the units. This means consists of a manifold 69 and a set of hollow members 70. The manifold is horizontally elongated and is positioned in the box-like frame 25 between the rear portions of the generating units 10 and the rear end 29 of the frame. It is disposed midway between the top and bottom of the frame and has the ends thereof suitably secured to the frame sides 28. In its front wall the manifold 69 is provided with inwardly extending socket forming tubes 71. The latter communicate with the interior of the manifold and correspond in number to, and are aligned with, the spaces between the neutral or grounded electrodes 36 and 37 of the generating units. The hollow members 70 correspond in number to the units and are positioned horizontally and also longitudinally of the housing and embody enlarged flat sided heads 72 at their front ends and tubular parts 73 at their rear ends. The heads 72 fit between, and are cemented or otherwise secured to, the side plates 46 and 53 of the collecting boxes 38 and 39. They communicate with the interiors of the boxes 38 by way of aligned holes 74 and 75 in certain of their sides and in the rear portions of the side plates 46. By way of holes 76 in their other sides and registering holes 77 in the rear portions of the side plates 53 of the collecting boxes 39 the heads 72 of the hollow members 70 communicate with the interiors of the boxes 39. The rear ends of the tubular parts 73 fit slidably within the socket forming tubes 71 in the front wall of the manifold 69. The sliding connections between the tubular members 73 and the socket forming tubes 71 permit the hollow members 70 to slide out of engagement with the manifold when the generating units 10 are slid forwardly out of their operative position. A pipe 78 leads from the manifold 69 through the rear end wall 14 of the housing 9 and serves to deliver the ozone or ozonous air from the manifold to the point where such ozone or ozonous air is to be used or utilized. The manifold 69 and the pipes 78 together constitute a closed pipe system or means in the housing for delivering the ozone or ozonous air generated by the units 10 to the housing exterior. When the generator is in operation a portion of the air under pressure in the pressure chamber 17 within the housing enters the ozone producing spaces 43 and 50 of the generating units 10 and is converted or transformed into ozone or ozonous air. The ozone or ozonous air which is produced by the brush or corona discharge between the high tension and neutral or grounded electrodes flows under pressure through the slots 44 and 51 into the interior of the collecting boxes 38 and 39. From such boxes the ozone or ozonous air flows into the enlarged heads 72 of the hollow members 70 via the registering holes 74 and 75 and 76 and 77 and thence passes into the manifold 69 by way of the tubular parts 73.

The transformer 11 of the generator constitutes the medium for supplying high voltage current to the high tension electrodes of the generating units 10. It is of the step-up variety or type, as hereinbefore mentioned, and is mounted on a platform 79 in the rear end of the cylindrical shell 23. This platform is suitably secured in place. The transformer comprises a primary coil 80 and a pair of secondary coils 81. The primary coil is supplied with current by way of conductors 82. The latter lead from the primary coil to insulated binding posts 83 in the central portion of the rear end wall 14. The binding posts are connected to a source of electrical current by insulated leads (not shown). As shown diagrammatically in Figure 8 the electrical center of the secondary coils 81 of the transformer 11 is grounded to the platform 79. The shell 23, the box-like frame 25, and the mounting strips 66 and 68 are formed of metal with the result that the neutral or grounded electrodes 36 and 37 of the generating units 10 are at neutral potential or in grounded relation with the electrical center of the secondary coils of the transformer. One end of one secondary coil 81 is connected by an insulated conductor 84 and a sectional bus bar 85 to the high tension electrodes 32. The corresponding end of the other secondary coil 81 is connected by an insulated conductor 86 and a sectional bus bar 87 to the high tension electrodes 33. The conductors 84 and 86 lead inwardly from the secondary coils of the transformer along the sides 28 of the box-like frame 25. The bus bar 85 extends horizontally across, and is positioned in front of, the upper front corners of the dielectric plates 34. Its sections correspond in number to the high tension electrodes 32 and are connected to the latter by conductor strips 88. The bus bar 87 is disposed beneath the bus bar 85 and its sections are connected to the high tension electrodes 33 by conductor strips 89. The sectional arrangement of the bus bars is such that the sections may be readily disconnected from one another in connection with removal of any or all of the generating units 10 from the housing. If, for example, the transformer is of such design that a 20,000 volt current is created in the secondary coils then, due to the specific electrical hook-up heretofore described, a 10,000 volt current will be transmitted to the high tension electrodes 32 via the conductor 84 and the sectional bus bar 85 and a 10,000 volt current will be transmitted to the high tension electrodes 33 by way of the conductor 86, and the sectional bus bar 87. By having the transformer positioned in the housing 9 the generator as a whole is compact and is essentially in the form of a self-contained unit.

In order to circulate the air in the pressure chamber 17 the generator is provided with a fan 90. This fan corresponds in diameter to, and is positioned immediately adjacent, the circular hole 31 in the rear end 29 of the box-like frame 25. It comprises a plurality of radially extending blades and is driven by means of an electric motor 91. The latter is mounted on a crossbar 92 which extends across, and is suitably secured at the ends thereof to, the central portion of the shell 23. The fan is so designed that when it is driven by the electric motor 91 it operates to draw air into the rear end of the shell and to cause such air to flow past the transformer and then through the frame 25. As the air passes the transformer it serves to cool the latter. As the air passes through the frame 25 it operates to cool the electrodes and dielectric plates of the generating units. After passing through the frame 25 the air flows around the front end of the shell 23 and then passes in an annular stream back to the rear end of the shell through the annular space between the shell and the side wall 12 of the housing 9. During flow of the air past the front ends of the generating units a portion of the air enters the ozone producing spaces 43 and 50. The fan is preferably driven at high speed so that it operates rapidly to circulate the air under pressure in the housing. By employing the fan 90 in the housing it is possible to make the generating units of the air-cooled type and also effectively and efficiently to cool the various parts of the units. In order to cool the air as it flows through the annular space between the shell 23 and the side wall 12 of the housing a water jacket 93 is provided. This jacket surrounds the side wall 12 of the housing and is formed by a cylindrical outer shell 94. The latter extends around and is concentrically disposed with respect to the side wall 12 and is welded or otherwise secured at its front end to the out-turned flange 15. The rear end of the shell 94 is suitably secured to the out-turned flange 16 at the rear end of the housing side wall 12. Water is circulated through the jacket by way of an inlet pipe 95 and an outlet pipe 96. The discharge end of the inlet pipe is connected to the front lower portion of the shell 94 and the inlet end of the outlet pipe is connected to the upper rear portion of the shell 94. It is contemplated that during operation of the generator water under pressure will flow continuously into the jacket 93 by way of the inlet pipe 95. Such water, after circulating through the jacket, is discharged via the outlet pipe 96 and operates to absorb heat from the air under pressure in transit through the annular space between the shell 23 and the side wall 12 of the generator housing. The water jacket 93 constitutes a simple form of heat exchanger for cooling the air under pressure which is rapidly circulated by the fan within the pressure chamber 17 during operation of the generator. The heat exchanger instead of being in the form of a water jacket may be in the form of a radiator or spiral coil pipe in the pressure chamber 17.

Assuming that current is being supplied to the transformer 11, the fan 90 is in motion or operation and water is being circulated through the jacket 93, the operation of the generator is as follows: The air which is rapidly circulated within the pressure chamber 17 by the fan passes first past the transformer 11, as heretofore described, and then flows through the box-like frame 25. A portion of the air flowing through such frame enters the ozone producing spaces 43 and 50 of the generating units 10 and is transformed into ozone or ozonous air. Such ozone or ozonous air flows, as hereinbefore described, into the manifold 69 via the boxes 38 and 39 and the hollow members 70. The air as it flows through the frame 25 passes the electrodes and dielectric plates and absorbs heat from them. The portion of the air which does not pass into the spaces 43 and 50 flows around the outer end of the shell 23 and back to the rear end of the shell via the annular space between the shell and side wall of the housing 9. As such air passes through the aforementioned space it is cooled as the result of the heat absorptive action of the water in the jacket 93. Due to the action of the fan and the heat absorptive effect of the water in the jacket effective cooling of the transformer and generating units takes place. The flow of air through the ozone producing spaces 43 and 50 is regulated by the capacity or speed of drive of the compressor which is connected to the pipe 18. But a small portion of the air in the housing flows into the ozone producing spaces and the balance is in rapid circulation by the fan as heretofore described. Should it be desired to remove the generating units 10 it is only necessary to remove the front end wall 13 of the housing by withdrawing the bolts 20. After removal of such end wall and separation of the sections of the bus bars 85 and 87 the units may be slid forwardly through the open front end of the housing. When the units are slid back into place the tubular parts 73 of the hollow members 70 slide into the socket forming tubes 71 of the manifold 69. Should it be desired to inspect or repair the transformer 11 or the motor 91 for the fan 90 it is only necessary to remove the rear end wall 14 of the housing by withdrawing the bolts 22.

The herein described electric ozone generator is compact and, due to its construction and design, may be manufactured at a comparatively low and reasonable cost. It is exceptionally efficient in operation and requires practically no servicing in view of the simple and improved means for cooling the units. Because of the manner in which the ozone generating units 10 are mounted such units are readily accessible for repair, inspection or replacement purposes. Due to the specific electrical hook-up between the transformer and the generating units but a single transformer is necessary and the housing as well as the outer jacket forming the shell 94 is at ground or zero potential.

The invention is not to be understood as restricted to the details set forth since these may be modified within the scope of the appended claims without departing from the spirit and scope of the invention.

Having thus described the invention what I claim as new and desire to secure by Letters Patent is:

1. An ozone generator of the character described, comprising in combination an air-tight housing, means for supplying air under superatmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space to the housing exterior, and means independent of the air supply means and within the housing for repeatedly and rapidly circulating the air under pressure in said housing around the generating unit for cooling purposes.

2. An ozone generator of the character described, comprising in combination an air-tight housing, means for supplying air under superatmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space to the housing exterior, and a motor driven fan positioned in the housing and arranged so that during drive thereof it operates repeatedly and rapidly to circulate the air under pressure in the housing around the generating unit for cooling purposes.

3. An ozone generator of the character described, comprising in combination an air-tight housing, means for supplying air under superatmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space to the housing exterior, a step-up transformer positioned in the housing and having the secondary coil thereof electrically connected to the high tension electrode of the unit, and means independent of the air supplying means and within the housing for causing the air under pressure in said housing to circulate repeatedly and successively past the transformer and generating unit for cooling purposes.

4. An ozone generator of the character described, comprising in combination an air-tight housing, means for supplying air under superatmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space to the housing exterior, a step-up transformer disposed in the housing in spaced relation with the unit and having the secondary coil thereof electrically connected to the high tension electrode, and a motor driven fan disposed in the housing between the transformer and the unit and arranged and adapted during drive thereof to cause the air under pressure in the housing to circulate repeatedly and successively past the transformer and unit for cooling purposes.

5. An ozone generator of the character described, comprising in combination an air-tight housing, an open ended shell disposed in the housing in spaced relation with the side wall of the latter, means for delivering air under super-atmospheric pressure into the housing, an air-cooled ozone generating unit positioned in the shell so that air can pass thereby and comprising high tension and neutral or grounded electrodes with an ozone producing space between them adapted to receive a portion of the air under pressure in the housing, a closed pipe system in the housing for delivering the ozone or ozonous air produced in said space to the exterior of said housing, and a motor driven fan disposed in the housing and arranged so that when it is driven it causes the air under pressure in the housing to circulate rapidly and repeatedly first through the shell and past the unit and then through the space between the shell and the housing side wall.

6. In an ozone generator of the character described, the combination of an air-tight horizontally elongated housing with a continuous side wall, means in one end of the housing forming an open ended shell in spaced relation with said side wall, means for delivering air under super-atmospheric pressure into the housing, an air-cooled ozone generating unit positioned in the shell so that air can pass thereby and comprising high tension and neutral or grounded electrodes with an ozone producing space between them and adapted to receive a portion of the air under pressure in the housing, a closed pipe system in the housing for delivering the ozone or ozonous air produced in said space to the exterior of said housing, a transformer disposed in the other end of the housing and having the secondary coil thereof connected electrically to the high tension electrode of the unit, and a motor driven fan disposed in the housing and arranged and adapted so that when it is driven it operates continuously and repeatedly to cause the air under pressure in said housing to flow past the transformer and through the shell for transformer and unit cooling purposes and then around the shell and through the space between the latter and the housing side wall.

7. In an ozone generator of the character described, the combination of an elongated air-tight housing, an elongated shell disposed in the housing in spaced relation with the side wall of the latter and having the ends thereof terminating inwardly of the housing ends, means for delivering air under super-atmospheric pressure into the housing, an air-cooled ozone generating unit disposed in one end of the shell and comprising high tension and neutral or grounded electrodes with an ozone producing space between them adapted to receive a portion of the air under pressure in the housing, a closed pipe system in the housing for delivering the ozone or ozonous air produced in said space to the exterior of said housing, a step-up transformer mounted in the other end of the shell and having the secondary coil thereof connected electrically to the high tension electrode of the unit, and a motor driven fan disposed in the shell between the unit and the transformer and adapted when driven to cause the air under pressure in the housing to flow repeatedly first in one direction through the shell and then in the reverse direction in the space between the shell and the housing side wall.

8. An ozone generator of the character described, comprising in combination an air-tight housing, means for supplying air under super-atmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space to the housing exterior, means independent of the air supplying means and within the housing for repeatedly circulating the air under pressure in said housing around the generating unit, and means for cooling the air under pressure as it is repeatedly circulated by the circulating means.

9. An ozone generator of the character described, comprising in combination an air-tight housing, means for supplying air under super-atmospheric pressure into the housing, an ozone generating unit disposed in the housing and comprising high tension and neutral or grounded electrodes with an ozone producing space between them and in communication with the housing interior, a closed pipe system in the housing for delivering the ozone or ozonous air produced in said space and conducting the same to the housing exterior, means independent of the air supplying means and within the housing for repeatedly circulating the air under pressure in said housing around the generating unit, and means comprising a water jacket around a portion of the housing for cooling the air under pressure in said housing as it is circulated by the circulating means.

10. An ozone generator of the character described, comprising in combination an air-tight housing, an open ended shell disposed in the housing in spaced relation with the side wall of the latter, means for delivering air under super-atmospheric pressure into the housing, an air-cooled ozone generating unit disposed in the shell so that air can pass thereby and comprising high tension and neutral or grounded electrodes with an ozone producing space between them adapted to receive a portion of the air under pressure in the housing, means for collecting the ozone or ozonous air produced in said space and transmitting the same to the exterior of the housing, a motor driven fan disposed in the housing and arranged so that when it is driven it causes the air under pressure in the housing to circulate rapidly and repeatedly through the shell and around the unit and then through the space between the shell and the housing side wall, and means for cooling the circulated air under pressure in the housing as it circulates through said last mentioned space.

11. In an ozone generator of the character described, the combination of an air-tight horizontally elongated housing having a continuous side wall, an elongated shell disposed longitudinally in the housing and in spaced relation with said side wall and having the ends thereof terminating inwardly of the ends of the housing, means for delivering air under super-atmospheric pressure into the housing, an air-cooled ozone generating unit disposed in one end of the shell so that air can pass thereby and comprising high tension and neutral or grounded electrodes with an ozone producing space between them adapted to receive a portion of the air under pressure in the housing, means for collecting the ozone or ozonous air produced in said space and transmitting the same to the exterior of the housing, a step-up transformer disposed in the housing in spaced relation with the unit and having the secondary coil thereof connected electrically to the high tension electrode of the unit, a motor driven fan disposed in the housing and arranged so that when it is driven it causes the air under pressure in the housing to circulate rapidly and repeatedly through the shell and then around said shell and through the space between the shell and the housing side wall, and means for cooling the air as it circulates through the last mentioned space comprising a water jacket around the housing side wall and a pipe system for flowing water through the jacket.

12. In an ozone generator of the character described, the combination of an air-tight cylindrical horizontally extending housing, an elongated cylindrical shell of less diameter and length than the housing disposed longitudinally in the housing and in spaced relation with the side wall of the housing and having the ends thereof terminating inwardly of the ends of the housing, means for delivering air under super-atmospheric pressure into the housing, an air-cooled ozone generating unit disposed in one end of the shell so that air can pass thereby and comprising high tension and neutral or grounded electrodes with an ozone producing space between them adapted to receive a portion of the air under pressure in the housing, means for collecting the ozone or ozonous air produced in said space and transmitting the same to the exterior of the housing, a step-up transformer disposed in the other end of the shell and having the secondary coil thereof connected electrically to the high tension electrode of the unit, a motor driven fan disposed in the shell between the generating unit and the transformer and adapted when driven to cause the air under pressure in the housing to circulate rapidly and repeatedly through the shell and then around said shell and through the space between the shell and the housing side wall, and means for cooling the air as it circulates through the last mentioned space comprising a water jacket around the housing side wall and a pipe system for flowing water through the jacket.

13. An ozone generator of the character described, comprising in combination an elongated normally closed housing having a removable closure member at one end thereof, a series of side-by-side plate type ozone generating units extending longitudinally of the housing and slidably mounted in said one end of the housing so that they may be slid longitudinally and individually out of their operative position for replacement or other purposes upon removal of the closure member, and a step-up transformer mounted in the other end of the housing and having the secondary coil thereof separably connected to the units.

14. An ozone generator of the character described, comprising in combination an elongated normally closed air-tight housing having a removable closure member at one end thereof, means for supplying air under super-atmospheric pressure into the housing, a series of side-by-side plate type ozone generating units extending longitudinally of the housing, mounted in said one end of the housing so that they are individually removable from the housing upon removal of the closure member and comprising high tension and neutral or grounded electrodes with ozone producing spaces between them and in communication with the housing interior, a closed pipe system in the housing designed to collect the ozone or ozonous air produced in said spaces and transmit the same to the exterior of the housing and having a part thereof in releasable sliding contact with the units, and a motor driven fan positioned in the housing between the units and the other end of the housing and adapted during drive thereof continuously and rapidly to circulate the air under pressure in the housing past the generating units for cooling purposes.

15. An ozone generator of the character described, comprising in combination an elongated normally closed air-tight housing having a removable closure member at one end thereof, means for supplying air under super-atmospheric pressure into the housing, a series of side-by-side plate type ozone generating units extending longitudinally of the housing, slidably mounted in said one end of the housing so that they are individually removable from the housing upon removal of the closure member and comprising high tension and neutral or grounded electrodes with ozone producing spaces between them and in communication with the housing interior, a closed pipe system in the housing designed to collect the ozone or ozonous air produced in said spaces and transmit the same to the exterior of the housing and having a part thereof in releasable sliding contact with the units, and a step-up transformer disposed in the other end of the housing and having the secondary coil thereof separably connected to the high tension electrodes of the units.

16. An ozone generator of the character described, comprising in combination an elongated normally closed air-tight housing having a removable closure member at one end thereof, means for supplying air under super-atmospheric pressure into the housing in side-by-side relation and a series of ozone generating units mounted in said one end of the housing so that they are individually removable from the housing upon removal of the closure member, and comprising high tension and neutral or grounded electrodes with ozone producing spaces between them and in communication with the housing interior, a closed pipe system in the housing designed to collect the ozone or ozonous air produced in said spaces and transmit the same to the exterior of the housing and having a part thereof removably connected to the units, a step-up transformer disposed in the other end of the housing and having the secondary coil thereof separably connected to the high tension electrodes of the units, and a motor driven fan disposed in the housing between the generating units and the transformer and adapted when driven repeatedly and rapidly to circulate the air under pressure in the housing so that it flows past the transformer and units for cooling purposes.

17. An electric ozone generator comprising a supporting structure, a series of ozone generating units mounted on the supporting structure so that they may be removed by sliding movement in one direction, and embodying high tension and neutral or grounded electrodes with ozone generating spaces between them, and means for collecting the ozone or ozonous air produced in the spaces, including a manifold in close proximity to the units and having open ended sockets in one of the walls thereof, and hollow members connected to the units and having the interiors thereof in communication with the spaces, said hollow members embodying tubular discharge members which fit slidably within the aforesaid sockets so that the members are readily removable with the units.

18. An electric ozone generator comprising a supporting structure, a rectilinear series of ozone generating units mounted on the supporting structure so that they may be removed individually by sliding movement in one direction and embodying high tension and neutral or grounded electrodes with ozone producing spaces between them, and means for collecting the ozone or ozonous air produced in the spaces, including a manifold fixedly mounted on the supporting structure in close proximity to the units and provided in one of the walls thereof and in opposed relation with the units a rectilinear series of open ended sockets, and a set of hollow members corresponding in number and connected fixedly to the units respectively and having the interiors thereof in communication with the ozone producing spaces, said members embodying tubular discharge members which fit slidably within the sockets and permit the members to be individually removed with their respective generating units.

JAMES M. DAILY.